US006915314B2

(12) United States Patent
Jackson et al.

(10) Patent No.: US 6,915,314 B2
(45) Date of Patent: Jul. 5, 2005

(54) SYSTEM FOR ARCHIVING AND RETRIEVING DATA FROM A DATABASE

(75) Inventors: Donnie Wayne Jackson, Cumming, GA (US); Ronnie Glenn Jackson, Cumming, GA (US); Timmie Dean Shadburn, Alpharetta, GA (US)

(73) Assignee: Adtech-Gesi, LLC, Alpharetta, GA (US)

( * ) Notice: Subject to any disclaimer, the term of this patent is extended or adjusted under 35 U.S.C. 154(b) by 352 days.

(21) Appl. No.: 10/014,695

(22) Filed: Dec. 11, 2001

(65) Prior Publication Data

US 2003/0120625 A1 Jun. 26, 2003

(51) Int. Cl.[7] .............................................. G06F 17/30
(52) U.S. Cl. ............................ 707/204; 707/3; 707/10; 707/103 Z
(58) Field of Search ........................ 707/2–5, 10, 200, 707/103 R–103 Z, 1, 100, 101, 102; 709/203

(56) References Cited

U.S. PATENT DOCUMENTS

| | | | |
|---|---|---|---|
| 5,187,750 A | 2/1993 | Behera | 382/140 |
| 5,535,256 A | 7/1996 | Maloney | 379/309 |
| 5,659,746 A | 8/1997 | Bankert | 707/205 |
| 5,696,811 A | 12/1997 | Maloney | 379/265.07 |
| 5,710,922 A * | 1/1998 | Alley et al. | 707/201 |
| 5,778,374 A | 7/1998 | Dang | 707/101 |
| 5,813,009 A * | 9/1998 | Johnson et al. | 707/100 |
| 5,818,907 A | 10/1998 | Maloney | 379/32.01 |
| 5,903,889 A * | 5/1999 | de la Huerga et al. | 707/3 |
| 5,907,848 A | 5/1999 | Zaiken | 707/202 |
| 5,930,806 A * | 7/1999 | Taira et al. | 707/204 |
| 5,946,677 A | 8/1999 | Bullen | 707/2 |
| 5,982,857 A | 11/1999 | Brady | 379/88.19 |
| 6,047,060 A | 4/2000 | Fedorov | 379/265 |
| 6,058,163 A | 5/2000 | Pattison | 379/34 |
| 6,188,762 B1 | 2/2001 | Shooster | 379/265 |
| 6,189,001 B1 | 2/2001 | McGovern | 707/1 |
| 6,651,076 B1 * | 11/2003 | Asano | 707/204 |

* cited by examiner

Primary Examiner—Greta L Robinson
Assistant Examiner—Cheryl Lewis
(74) Attorney, Agent, or Firm—Jason A. Bernstein; Powell Goldstein, LLP

(57) ABSTRACT

An Administrator Module existing as a layer of software residing on an Originating System's computer. A Server Module existing as a layer of software residing on the Originating System or some other system accessible by the Originating System. The Administrator and Server Modules enable voluminous data of all types to be archived and retrieved by a user. The Administrator Module periodically or at a scheduled time analyzes the Originating System's computer for candidate data to be archived. The Administrator Module formulates a table indicating candidate data for archiving in an alternative storage medium accessible by the originating system. The Administrator Module, upon command by the Originating System archives the candidate data and routinely purges data from the alternative storage media once that data has reached a predefined age. On demand the table indicating archived data is available for review by the user of the Originating System. Upon command by the user, the Server Module extracts selected data of interest from the alternative storage medium and restores the data to the Originating System's file directories.

15 Claims, 3 Drawing Sheets

SYSTEM FOR ARCHIVING AND RETRIEVING DATA FROM A DATABASE

FIELD OF THE INVENTION

The present invention relates to a data manager for archiving and retrieving data. In particular, the present invention relates to a system for managing the flow of data between an Originating System and a medium for storing data. More particularly, the invention relates to an Administrator Module and Server Module having a plurality of data structures stored in the system wherein the data structures are formulated into instruction objects to direct the functioning of archiving and retrieving data.

BACKGROUND OF THE INVENTION

Historically, data generated by a user of a computer was either saved in the memory of the computer, stored in some other type of memory or printed on paper, i.e., a hard copy of the generated data. Storing of data within the computer's memory had it limitations. As data became voluminous, the size of the computer's memory also became voluminous. The added cost of providing random access memory for storing data in a computer's memory became prohibitive.

The floppy disk drive became the mainstay for storing data. The predominate or attractive feature of the floppy disk was that data could be stored on the floppy disk, removed from the floppy disk-drive and another floppy disk inserted in its place thereby creating an endless data storage medium. The floppy disk had limitations due to the limited amount of data that could be stored on a single floppy disk.

The solution to voluminous data, prohibitive cost of storing data in random access memory and the limited storage capacity of floppy disks took the form of storing data on punch cards, magnetic drums, hard-disks and compact-disks. Each of these attempts to solve the problem of storing voluminous data had varying degrees of success. Each method stored data and provided an almost endless supply of data storage space.

With the advent of client-server technology, i.e., a plurality of users of computer terminals all connected to a central server, the need to store data increased. The proliferation of client-server technology coupled with the need for data storage created a secondary problem related to data storage, i.e., supportability and accessibility to the stored data.

When data was stored using any of the above discussed data storage media, the problem of storing the data storage medium themselves emerges. Once a storage medium was taken off-line from the computer or client-server, access to the data stored thereon became problematic. Attempts to solve the secondary problem of supportability and accessibility to the stored data took the form of compressing the data and storing it on various types of storage media, which could remain on-line and accessible to the computer or client-server. This attempt solved only part of the problem of supportability and accessibility.

Generally, when data was compressed and stored on a storage medium, identifying the data on the storage medium emerged as a limitation to this technology due to the limited identification of the data on the compressed data header. For example, voluminous data that was compressed and stored on an on-line storage medium allows a limited number of characters or numbers to identify the compressed data. A particular or desired data file stored in this manner became inaccessible to the user because the data file of interest might not be listed in the compressed data header. The user was forced to uncompress all of the compressed data and manually (with the aid of a computer) search for the data file of interest.

Supportability and accessibility of stored data and retrieving stored data became particularly evident in companies or organizations engaged in telephone solicitation or call-center technology. By law, some companies or organizations engaged in call-center technology must retain the voice and data text transactions between the organization and the person being contacted by telephone for a prescribed period of time. Recording voices and storing text data generated an even greater quantity of data requiring storage.

It would be desirable to have a facilitator to plan, organize and implement data storage technology that would enable voluminous data of all types to be kept on an alternative storage medium accessible by the originating system and that would be supportable and accessible by an on-line user. The facilitator would periodically or at a scheduled time analyze the computer or client server for data in need of storage. The facilitator would formulate a listing of the intended stored data, store the data on an alternative storage medium accessible by the originating system and remove the original data from the computer or client server. On demand the facilitator would produce the aforementioned listing of stored data for review by the user. Upon command by the user, the facilitator would extract the data of interest from the alternative storage medium. The requested data would be made available on the original system.

SUMMARY OF THE INVENTION

The present invention consists of an Administrator Module, that exists as a layer of software residing on the Originating System's computer or client-server, and a Server Module that resides on that same server or any server that can communicate with the Originating System. The Administrator Module plans, organizes and implements the archiving of data to an alternative storage medium accessible by the originating system. The Server Module plans, organizes, and implements the retrieval of data stored on the alternative storage medium. Together, the Administrator and Server Modules enable voluminous data of all types to be archived and retrieved. The Administrator Module periodically or at a scheduled time analyzes the Originating System's computer or client-server for candidate data to be archived. The Administrator Module formulates a table indicating candidate data for archiving in an alternative storage medium. The Administrator Module, upon command by the Originating System or at a scheduled time, archives the candidate data and then removes the candidate data from the Originating System's computer or client-server database. On demand, the table indicating archived data is available for review by the user. Upon command by the user, the Server Module extracts selected data of interest from the alternative storage medium and restores the data to the Originating System's computer.

The Administrator Module commands and controls the intelligent archiving of data records stored on the Originating System's computer or client-server database via a plurality of data structures formulated into a Migrator Object, an Auto-Purge Object, and a Scheduling Object. The objects, individually or in concert, command and control the operational functions of the Administrator Module. The Server Module commands and controls the retrieval of archived files from the alternative storage medium via a Controller Object and a Requestor Object.

The Migrator Object selectively gathers data records by scanning the original database and selects those records meeting the parameters specified by the system administrator. The Migrator Object formulates a data record event from the received data records. The Migrator Object archives the data record event in a selected database or alternative data storage medium accessible by the Originating System. The Migrator Object formulates an event table. The event table is a listing of selected attributes concerning the archive data records displayable to the user or users of the Originating System.

The Auto-Purge Object in communication with the Migrator Object purges the Originating System's database of the archived data. The Auto-Purge Object may, if desired, purge the Originating System's database of the archived data following the archiving of the data by the Migrator Object or at any convenient or scheduled time selected by the Originating System.

The Controller Object 20 communicates with the user via a graphical user interface (GUI) 23, FIG. 2. The Controller Object 20 receives instruction for the operation of the Server Module 11A via the GUI 23. The user of the GUI 23 may, if desired, view a particular day's 24 archived data record event(s). The user makes a selection and the Controller Object 20 displays the data record event table 26 where upon the user may make a desired selection for the retrieval of the data record event (as discussed above). The user may, if desired, select individual files referenced by the data record event to be restored, or all files referenced by the data record event. The user may, if desired, sort the data record event table 26 to a more convenient arrangement or display of data record events.

The Scheduling Object in communication with the Requestor Object schedules an appropriate time for the operation of the Administrator Module. The system administrator utilizing the Scheduling Object may, if desired, construct a schedule to optimize the Originating System's resources by scheduling the operation of the Administrator Module at off-peak time periods or at any other convenient time period derived from the Originating System's operating characteristics.

The Requestor Object upon demand by the user or users of the Originating System may, if desired, retrieve selected data derived from the event table constructed by the Migrator Object. The retrieved data is transmitted to the Originating System. The Originating System is notified that the retrieved data is available for restoring to the Originating System's database or databases.

When taken in conjunction with the accompanying drawings and the appended claims, other features and advantages of the present invention become apparent upon reading the following detailed description of embodiment of the invention.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
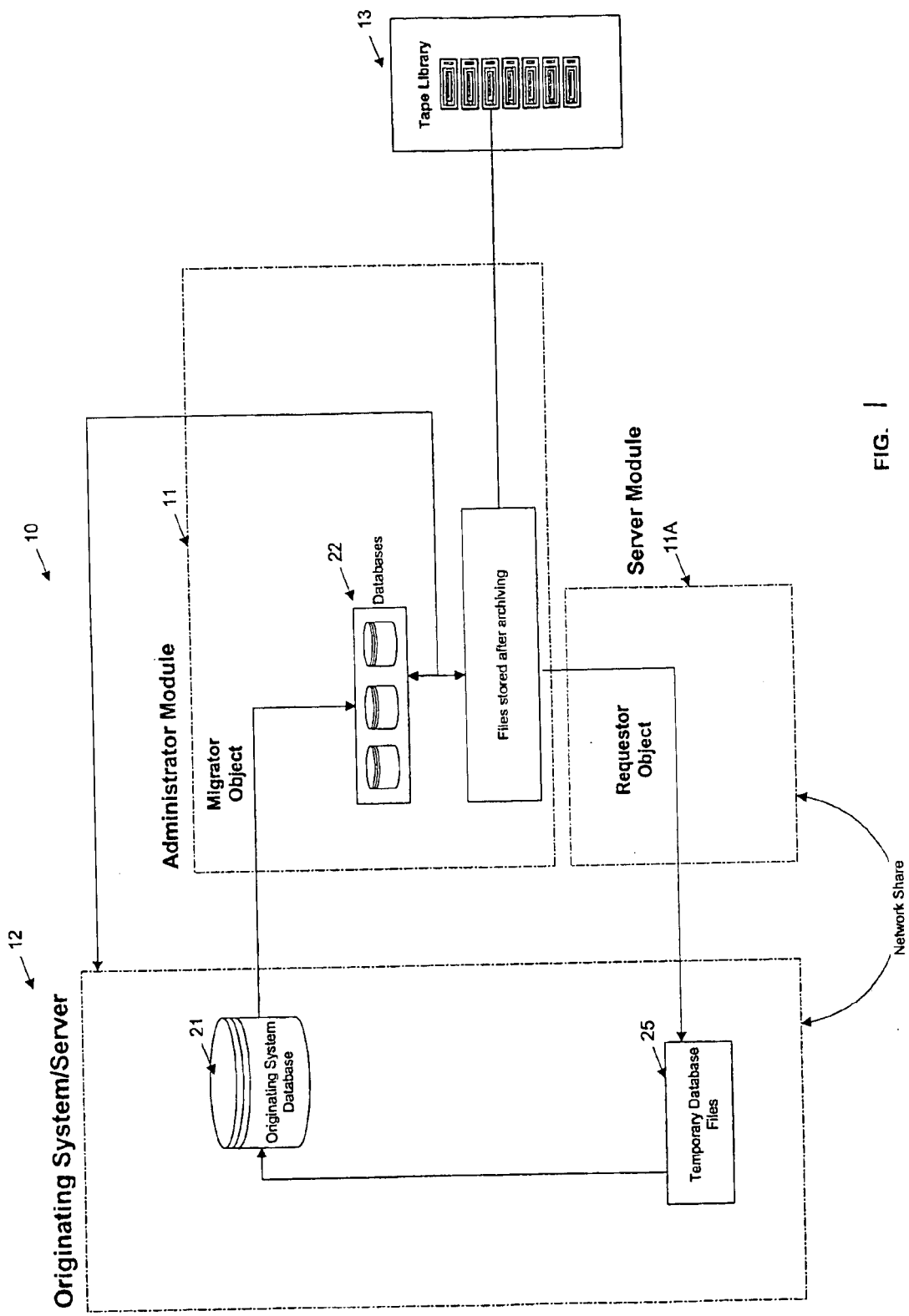
FIG. 1 illustrates a block diagram view of the present invention.

Before describing in detail the particular improved system for archiving and retrieving data in accordance with the present invention, it should be observed that the invention resides primarily in the novel data structures of the system software and not in the combination of conventional system apparatus. Examples of a system apparatus include computers with memory, recording tape machines, read/write compact disk machines and associated computer displays. The present invention utilizes discrete subsystems or subassembly components, and associated control of the aforementioned system apparatus and components. The invention is not in the particular detailed configuration of the system apparatus but in the command and control thereof. Accordingly, the data structures, command, control, and arrangement of the present invention have, for the most part, been illustrated in the drawings by readily understandable block diagrams. The drawings show only those specific details that are pertinent to the present invention in order not to obscure the disclosure with structural details which will be readily apparent to those skilled in the art having the benefit of the description herein.

An overview of the present invention 10 is shown in FIG. 1. The present invention 10 consists of Administrator and Server Modules that command and control intelligently archiving and retrieving data records in a database and the files referenced by those records. Candidate data records may, if desired, reference text data, voice data, image data or any other type of data file that can be stored electronically. The candidate data records may also reference a combination of the aforementioned data types. A single data record may, if desired, span a predetermined time period defining numerous data records.

To one of ordinary skill in the art of database technology archiving and retrieving voluminous data is a daunting task. Generally, voluminous data is compressed before archiving. The compressed voluminous data has no singular identification or attribute that denotes the actual contents of the compressed voluminous data. The top-level indicator of the compressed voluminous data is generally a file name and date when compressed or archived. The Administrator Module organizes and controls the selecting of referenced data to be archived from the Originating System's database or databases. The Server Module retrieves archived data on demand or during a scheduled time period.

A more detailed discussion of the present invention 10, FIG. 1: The Administrator Module 11 is a layer of software that is installed on an Originating System 12. The Originating System 12 may, if desired, be any system that requires archiving and retrieving of data stored thereon. The Originating System 12 may, if desired, have a data tape library 13, or other storage device, and be in communication with a plurality of users who periodically store data on the Originating System 12.

Figure 3:
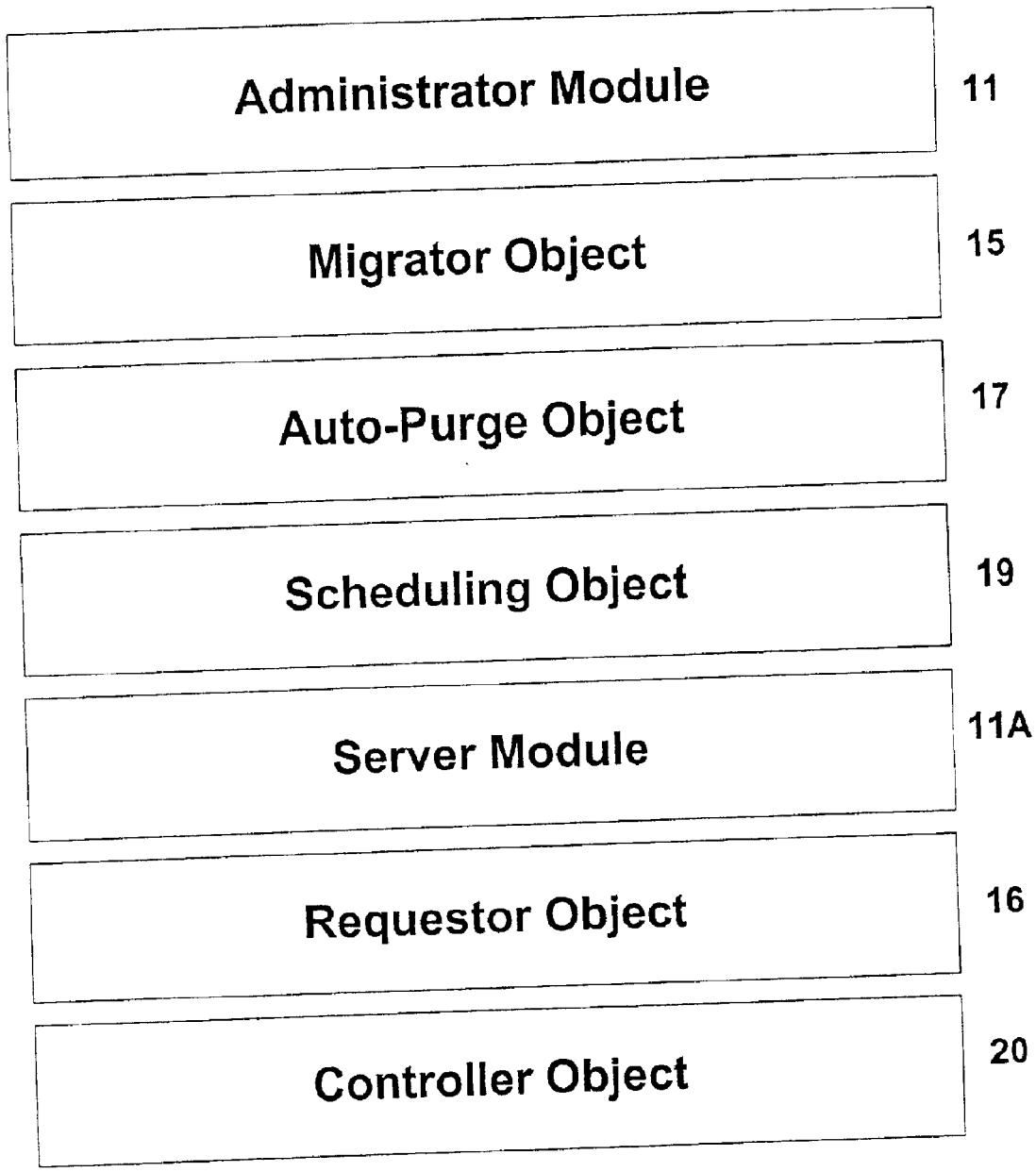

The Administrator Module 11, FIG. 3 is composed of a plurality of data structures formulated into a Migrator Object 15, an Auto-Purge Object 17, and a Scheduling Object 19. The aforementioned Objects, individually or in concert, command and control the operational functions of the Administrator Module 11.

The Server Module 11A, FIG. 3 is composed of a plurality of data structures formulated into a Controller Object 20 and a Requestor Object 16.

The Migrator Object 15 selects data files stored on the Originating System Server's Database 21 for archiving on the data tape library 13 or other storage media. The selection process of data files to be archived is predetermined by the Migrator Object 15. The Migrator Object 15 requests from the Originating System Database 21 all of the attributes associated with the individual data files referenced by the selected database entries. The Migrator Object 15 formulates a data record containing attributes of all of the selected individual data files. The data record may, if desired, contain selected individual data files referenced by the Originating System's Database 21 that have accumulated over any convenient time period. For example, the Migrator Object 15 has determined that individual data files accumulated over a 24-hour period are to be archived on the data tape library 13 or other storage media. The attributes requested by the Migrator Object 15 may, if desired, be any convenient notation that represents pertinent information about the data files to be formulated into a data record. For example, the Originating System Database 21 provides the Migrator Object 15 with attributes concerning the data file by referencing database fields associated with the file. The Migrator Object 15 appends the attributes received from the Originating System Database 21 to the data record thereby formulating a data record event. Subsequently, the data record event is stored in an individual database 22, FIG. 1. The individual database 22 is then stored on the Originating System and referenced files are stored on the data tape library 13, or equivalent, at a predetermined time provided by the Scheduling Object 19. The predetermined time is selected by the Originating System 12.

The Originating System Database 21 provides the Migrator Object 15 with a listing of the data record events along with any other data concerning the present location of the data record events stored during any given time period. The present location of the data record events may, if desired, be any convenient storage medium accessible to the Originating System 12. For example, the present location of the data record events is on the data tape library 13 or data tapes.

The Auto-Purge Object 17, FIG. 3 in communication with the Migrator Object 15 may, if desired, purge data record events from the Originating System's Database 21, FIG. 1. The Auto-Purge Object 17 selects information concerning the purging of data record events from the Individual Database 22. The selection process of purging data record events is dependent on the requirements of the Originating System 12. The Originating System 12 may have the accumulation of data record events stored on a limited size of database 21 or file directory thereby requiring the storing and purging of data record events more frequently than an Originating System with a larger database or databases or file directories. For example, the Auto-Purge Object 17 purges the files referenced by the Individual Database 22 automatically or immediately following the archiving of the data record events.

The Requestor Object 16, FIG. 3 in communication with the Controller Object 20 and in concert with the Originating System 12 restores data record events to the Originating System 12, FIG. 1 file directories. The Requestor Object 16 receives instructions from the Controller Object 20 via the user to retrieve a data record event(s) from the data tape library 13 or other storage media. The Requestor Object 16 retrieves selected data record event(s) and stores them in a temporary database or restore bucket 25. The Requestor Object 16 then notifies the Originating System 12 that the selected data record event(s) or individual data records are ready for restoring. Once the restoring process is completed by the Originating System 12, any or all of the original data files are ready for review.

The Scheduling Object 19, FIG. 3 schedules the appropriate time for the operation of the Administrator Module 11. The administrative user may, if desired, construct a schedule to optimize the Originating System's 12 resources by scheduling the operation of the Administrator Module 11 at off-peak time periods or at any other convenient time derived from the Originating System's 12 operating characteristics.

Figure 2:
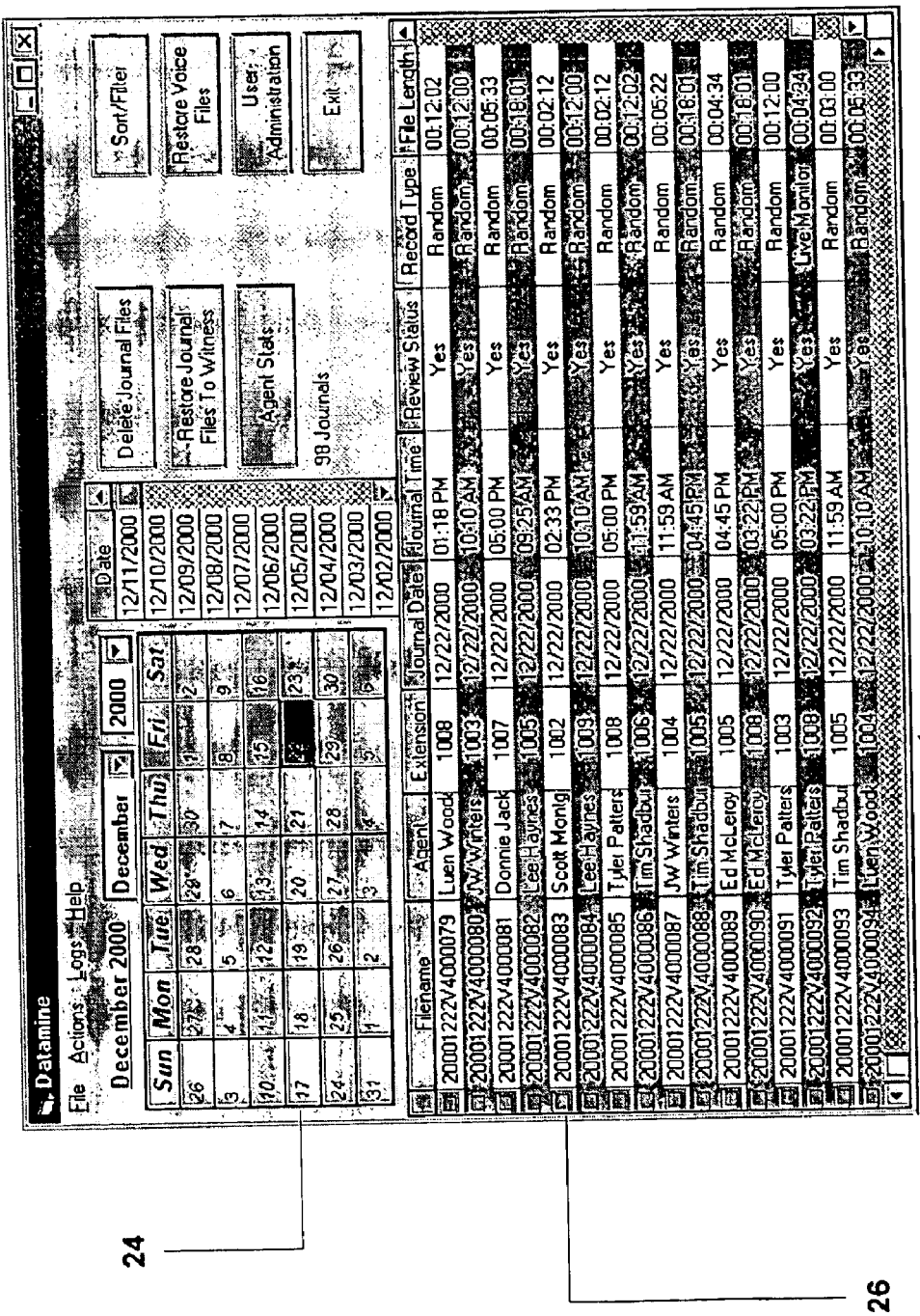
FIG. 2 illustrates a Graphical User Interface of the access port to the present invention, and, FIG. 3 illustrates a block diagram view of the Administrator and Server Modules of FIG. 1.

The Controller Object 20 communicates with the user via a graphical user interface (GUI) 23, FIG. 2. The Controller Object 20 receives instruction for the operation of the Server Module 11A via the GUI 23. The user of the GUI 23 may, if desired, view a particular day's 24 archived data record event(s). The user makes a selection and the Controller Object 20 displays the data record event table 25 where upon the user may make a desired selection for the retrieval of the data record event (as discussed above). The user may, if desired, select individual files referenced by the data record event to be restored, or all files referenced by the data record event. The user may, if desired, sort the data record event table 25 to a more convenient arrangement or display of data record events.

It will be understood that the method steps of the invention can be carried out in various sequences, and the sequences described herein are provided as an illustration only and by no means as a limitation in any sense. It will be further understood that the terms "a" and "an" as used herein are not intended to mean only "one," but may also mean a number greater than "one."

The present invention 10 may, if desired, be programmed in any suitable programming language known to those skilled in the art. An example of a programming language is disclosed in *C Programming Language*, 2/e, Kernighan & Richtie, Prentice Hall, (1989). The integration of the software aspect with the hardware component of the present invention 10 is delineated herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures.

While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims. All patents referred to herein are hereby incorporated by reference in their entirety.

Claimed is:

1. Administrator and Server Modules for archiving and retrieving an Originating System's data records, the Originating System in communication with at least one user, the user generating data records for archiving and retrieving, the Administrator and Server Modules having a plurality of data structures formulated into instruction objects to direct the functioning of archiving and retrieving data records generated by the user, comprising:

a) a Migrator Object selectively receiving the generated data records;

b) said Migrator Object formulating a data record event from said selectively received data records;

c) said Migrator Object storing said data record event in a selected database;

d) said Migrator Object formulating an event table from said stored data record events displayable to the Originating System;

e) a Requestor Object receiving a request stimulus for retrieval of a selected data record event;

f) said Requestor Object responsive to said request stimulus by retrieving at least one selected file referenced; and g) said Requestor Object transmitting said retrieved file to the Originating System;

whereby the Originating System restores the retrieved data.

2. The Administrator and Server Modules for archiving and retrieving an Originating System's data records of claim 1, further comprising:

h) an Auto-Purge Object in communication with said Migrator Object;

i) said Auto-Purge Object purging said data record event referencing data older than maximum age allowed subsequent to said Migrator Object said data records in said selected database.

3. The Administrator and Server Modules for archiving and retrieving an Originating System's data records of claim 2, further comprising:

j) said Controller Object in communication with said Requestor Object;

k) said Controller Object in communication with the Originating System user via a graphical user interface;

l) said Controller Object receiving at least one instruction via said graphical user interface;

m) said Controller Object transforming said instruction into commands for said in communication objects;

n) said Controller Object in concert with said Requestor Object communicates said event table to Originating System user; and, o) said Controller Object formulating user attribute data, said Controller Object transmitting said user attribute data to said Requestor Object.

4. The Administrator and Server Modules for archiving and retrieving an Originating System's data records of claim 3, further comprising:

p) a Scheduling Object in communication with said Migrator Object; and q) said Scheduling Object formulating a schedule optimizing the Originating System's resources relative the operation of Migrator Object.

5. The Administrator and Server Modules for archiving and retrieving an Originating System's data records of claim 4, wherein said Migrator Object selectively receiving data records comprises:

a) said Migrator Object selectively receiving said database attribute data; and b) said Migrator Object appending database attribute data to said data record event.

6. The Administrator and Server Modules for archiving and retrieving an Originating System's data records of claim 5, wherein said attribute data is selected from a group consisting of various database fields.

7. The Administrator and Server Modules for archiving and retrieving an Originating System's data records of claim 6, wherein said Migrator Object formulating a data record event from said selectively received data record comprises appending said attribute data to said selected user's data record.

8. The Administrator and Server Modules for archiving and retrieving an Originating System's data records of claim 7, said Migrator Object storing said data record event in a selected database wherein said selected database is selected from a group consisting of tape database or other storage media, static memory and dynamic memory.

9. The Administrator and Server Modules for archiving and retrieving an Originating System's data records of claim 8, wherein said Migrator Object in concert with Auto-Purge Object acts in purging the Originating System of selected files subsequent to storing said data record event.

10. The Administrator and Server Modules for archiving and retrieving an Originating System's data records of claim 9, wherein said stimulus being is derived from said event table by the Originating System.

11. The Administrator and Server Modules for archiving and retrieving an Originating System's data records of claim 10, wherein said Migrator Object's received generated data records comprise text data.

12. The Administrator and Server Modules for archiving and retrieving an Originating System's data records of claim 11, wherein said Migrator Object's received generated data records.

13. The Administrator and Server Modules for archiving and retrieving an Originating System's data records of claim 1, wherein said Migrator Object is further for causing said received data records to be removed from the Originating System.

14. An article of manufacture comprising:

a) a computer usable medium having computer readable program code means embodied therein for causing a response to an Originating System generating data records, said computer readable program code means in the article of manufacture comprising:

b) computer readable program code means for causing a computer to selectively formulate a data record event relative to said Originating System's generated data records;

c) computer readable program code means for causing a computer to store on a selected database said data record event and said data records;

d) computer readable program code means for causing a computer to formulate a data record table from said stored data record event;

e) computer readable program code means for causing a computer to derive from said data record table a stored data record event; and f) computer readable program code means for causing a computer to selectively retrieve said derived data record from said selected database.

15. The article of manufacture of claim 14, wherein said computer readable program code means is further for causing said data records to be removed from the Originating System.

* * * * *